United States Patent [19]

Moore

[11] Patent Number: 6,035,191

[45] Date of Patent: *Mar. 7, 2000

[54] STANDBY OPERATION IN A WIRELESS COMMUNICATION DEVICE

[75] Inventor: Douglas Craig Moore, Elgin, Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/347,647

[22] Filed: Nov. 30, 1994

[51] Int. Cl.[7] .................................................. H04M 3/00
[52] U.S. Cl. ........................................... 455/418; 455/553
[58] Field of Search .......................... 455/89, 33.1, 38.3, 455/343, 54.1, 186.1, 90, 550, 564–565, 567, 575, 422, 425, 566, 418, 553; 379/59, 200

[56] References Cited

U.S. PATENT DOCUMENTS

| | | | |
|---|---|---|---|
| 4,122,304 | 10/1978 | Mallien, II | 455/90 |
| 5,170,491 | 12/1992 | Murata | 455/89 |
| 5,200,995 | 4/1993 | Gaukel et al. | 379/200 |
| 5,212,810 | 5/1993 | Maeda et al. | 455/186.1 |
| 5,237,603 | 8/1993 | Yamagata et al. | |
| 5,363,430 | 11/1994 | Yamagata et al. | |
| 5,471,524 | 11/1995 | Colvin et al. | 379/200 |
| 5,542,103 | 7/1996 | Mottier et al. | 455/89 |

FOREIGN PATENT DOCUMENTS 2276516A 9/1994 United Kingdom .

OTHER PUBLICATIONS

Motorola Dyna T–A–C 6000XL, Cellular Mobile Telephone, User's Manual, 1987.

*Primary Examiner*—Nguyen Vo
*Attorney, Agent, or Firm*—John J. King; Daniel R. Collopy

[57] ABSTRACT

A wireless communication device (106, 108) incorporates a convenient method for storing/enabling preferred functions which are activated when the communication device is in a standby mode. Recent products and systems adapted to operate with cellular systems have enhanced the functionality of a wireless communication device when a user is not present. For example, the transmission of cellular digital messages, paging messages and facsimiles or computer files by way of cellular networks can be accomplished when a cellular telephone is unattended. The present invention eliminates the need for a user to enable a standby mode before a communication device (404) is left unattended. Further, the present invention provides preferred functions to be enabled (306) when the communication device in the standby mode. If the standby mode is selected (406), the communication device will automatically perform preferred standby functions (414) after the device is unattended.

4 Claims, 4 Drawing Sheets

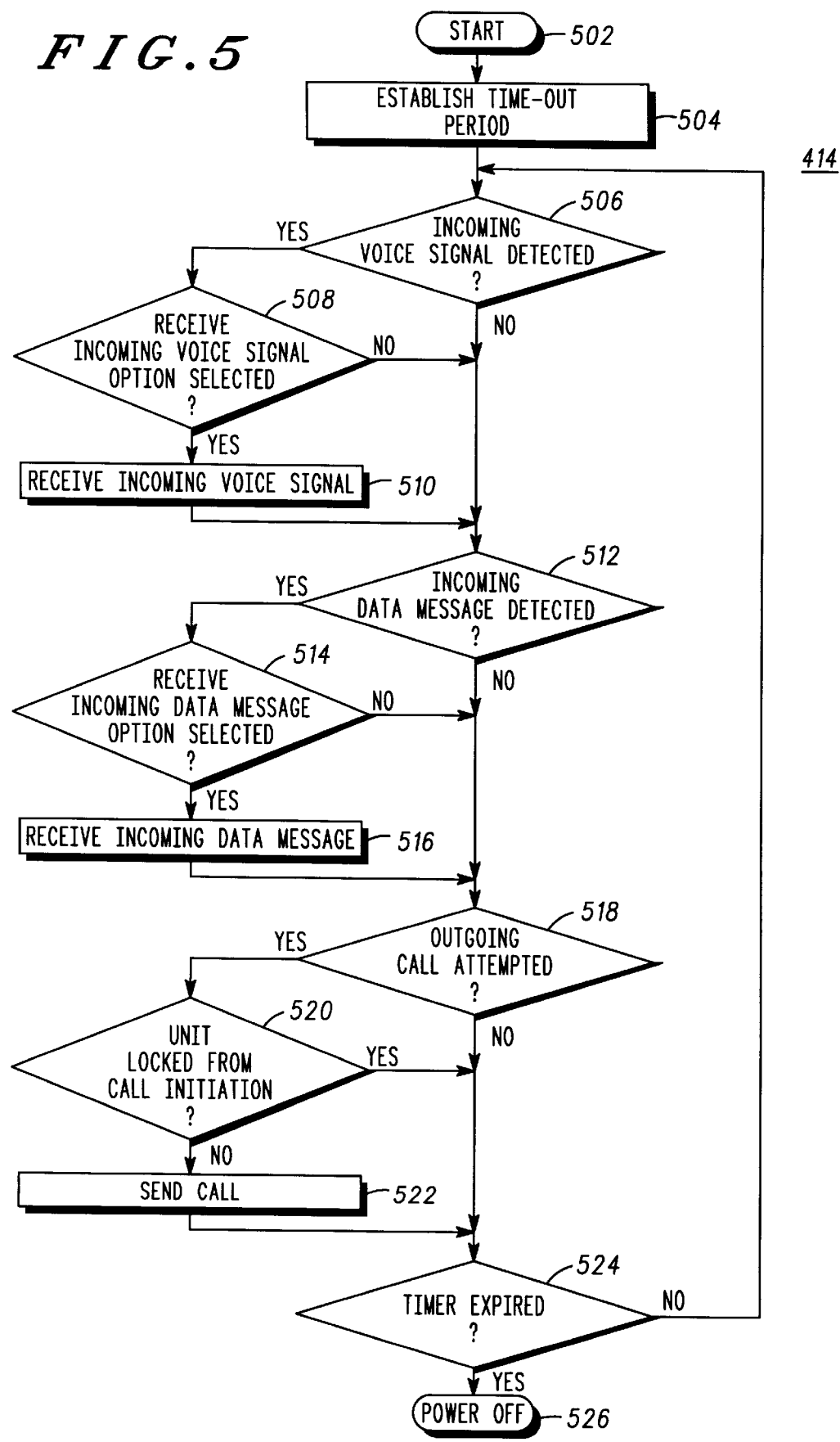

STANDBY OPERATION IN A WIRELESS COMMUNICATION DEVICE

FIELD OF THE INVENTION

This invention relates generally to communication devices, and more particularly to a method and apparatus for operating a wireless communication device in a standby mode.

BACKGROUND OF THE INVENTION

In recent years, the use of wireless communication devices has grown rapidly. One significant limitation to the use of a wireless communication device is the life of the battery used to power the device. While battery life has the greatest impact on "portable" wireless communication devices, wireless communication devices installed in a vehicle, commonly called "mobile" communication devices, also have battery life restrictions. Although a wireless communication device installed in a vehicle may not significantly effect the battery life of the vehicle when the vehicle is operating, a vehicle battery may be depleted if a wireless communication device is left on after the vehicle is turned off.

Most wireless communication devices installed in vehicles turn themselves off when the vehicle's ignition changes to the off state. According to this convenience on/off feature, the on/off state of the telephone follows the ignition high/low state. When the vehicle is off, the user must then manually turn on the wireless communication device, and in some cases, unlock the unit to place it in a standby receive mode. However, even in the standby mode of a conventional wireless communication device, unauthorized persons may transmit unauthorized phone calls or data.

The increased use of cellular digital messaging services, paging services and the transmission of facsimiles and computer files by way of cellular networks will require the communication unit to be in a standby mode when the user is away from the vehicle. Further, different features may be desired when in the standby mode. Accordingly, there is a need for a communication device having a standby mode to conveniently receive predetermined messages while the communication device is unattended, such as when the user is away from the vehicle. Further, there is a need for communication device having preselected features for a standby mode.

BRIEF DESCRIPTION OF THE DRAWINGS

FIG. 5 is a flow chart showing the operation of the communication device shown in block 414 of FIG. 4.

DETAILED DESCRIPTION OF THE INVENTION

Wireless communication systems have not only increased in popularity, but also in functionality. Some recent innovations have enabled functionality of a cellular telephone when a user is not present. For example, cellular digital messaging services, paging services and the transmission of facsimiles and computer files by way of cellular networks can be accomplished when a user is away from the cellular telephone. The present invention provides a convenient method/apparatus for selecting features to be activated in a standby mode. The present invention further provides a convenient method/apparatus for enabling standby operation in a wireless communication device.

Figure 1:
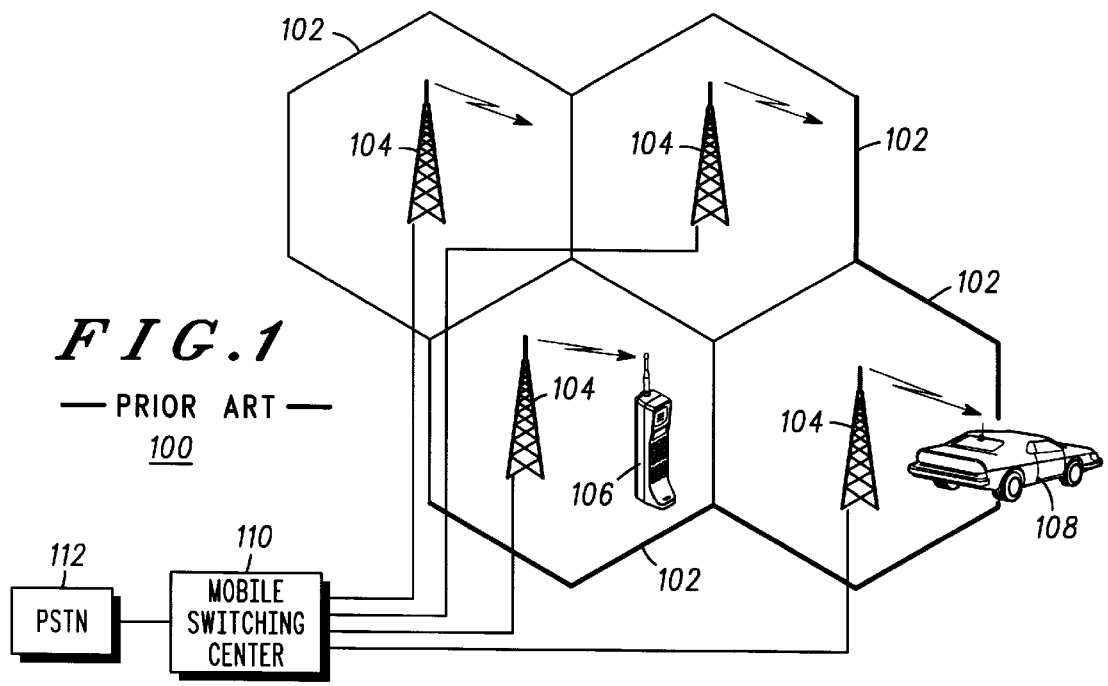
FIG. 1 is a conventional wireless communication system.

FIG. 1 shows a conventional wireless communication network 100, such as a cellular telephone network. The wireless communication network is divided into regions 102, each of which has a base station 104. The base stations are adapted to communicate with wireless communication devices, such as a portable communication device 106 or a mobile communication device 108 installed in a vehicle. The portable communication device could be inserted into a cradle installed in the vehicle. Such combinations of portables and cradles is well known in the art. Each of the base stations is coupled to a mobile switching center 110, which is coupled to the public system telephone network 112. While a conventional cellular telephone network is shown, the present invention could be employed in any wireless communication environment, such as paging, Personal Communication Services (PCS) or satellite communication services, where the communication device may be unattended.

Figure 2:
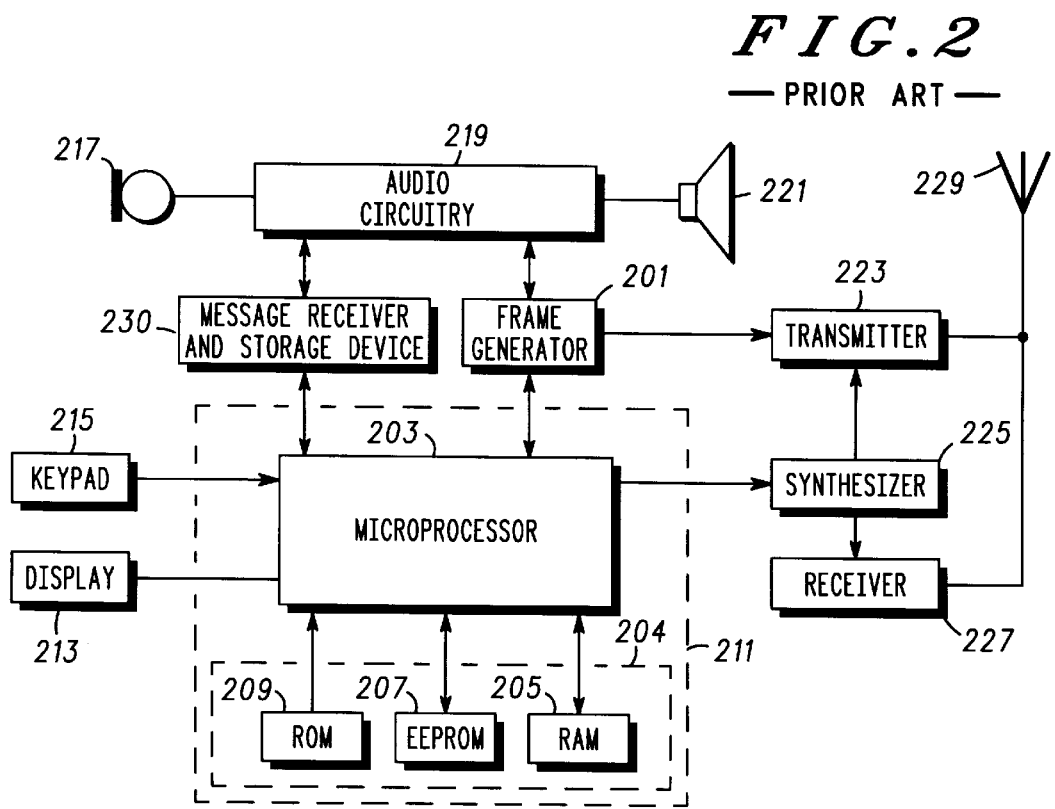
FIG. 2 is a conventional wireless communication device adapted to incorporate the present invention.

Turning now to FIG. 2, a block diagram of a conventional wireless communication device such as a cellular radiotelephone is shown. In the preferred embodiment, an ASIC (Application Specific Integrated Circuit) 201, such as a CMOS ASIC available from Motorola, Inc. and microprocessor 203, such as a 68HC11 microprocessor also available from Motorola, Inc., combine to generate the necessary communication protocol for operating in a cellular system. The microprocessor 203 uses RAM 205, EEPROM 207, and ROM 209, consolidated in one package 211 in the preferred embodiment, to execute the steps necessary to generate the protocol and to perform other functions for the communication unit, such as writing to a display 213, accepting information from a keypad 215, and controlling a frequency synthesizer 225. The ASIC 201 processes audio transformed by the audio circuitry 219 from a microphone 217 and to a speaker 221. Transmitter 223 transmits through an antenna 229 using carrier frequencies produced by the frequency synthesizer 225. Information received by the communication unit's antenna 229 enters the receiver 227 which demodulates the symbols comprising the message frame using the carrier frequencies from the frequency synthesizer 225. The wireless communication device may optionally include a message receiver and storage device including digital signal processing means. The message receiver and storage device could be, for example, a digital answering machine or a paging receiver. While the circuitry of FIG. 2 shows an exemplary wireless communication device, other circuitry could be employed within the scope of the present invention.

Figure 3:
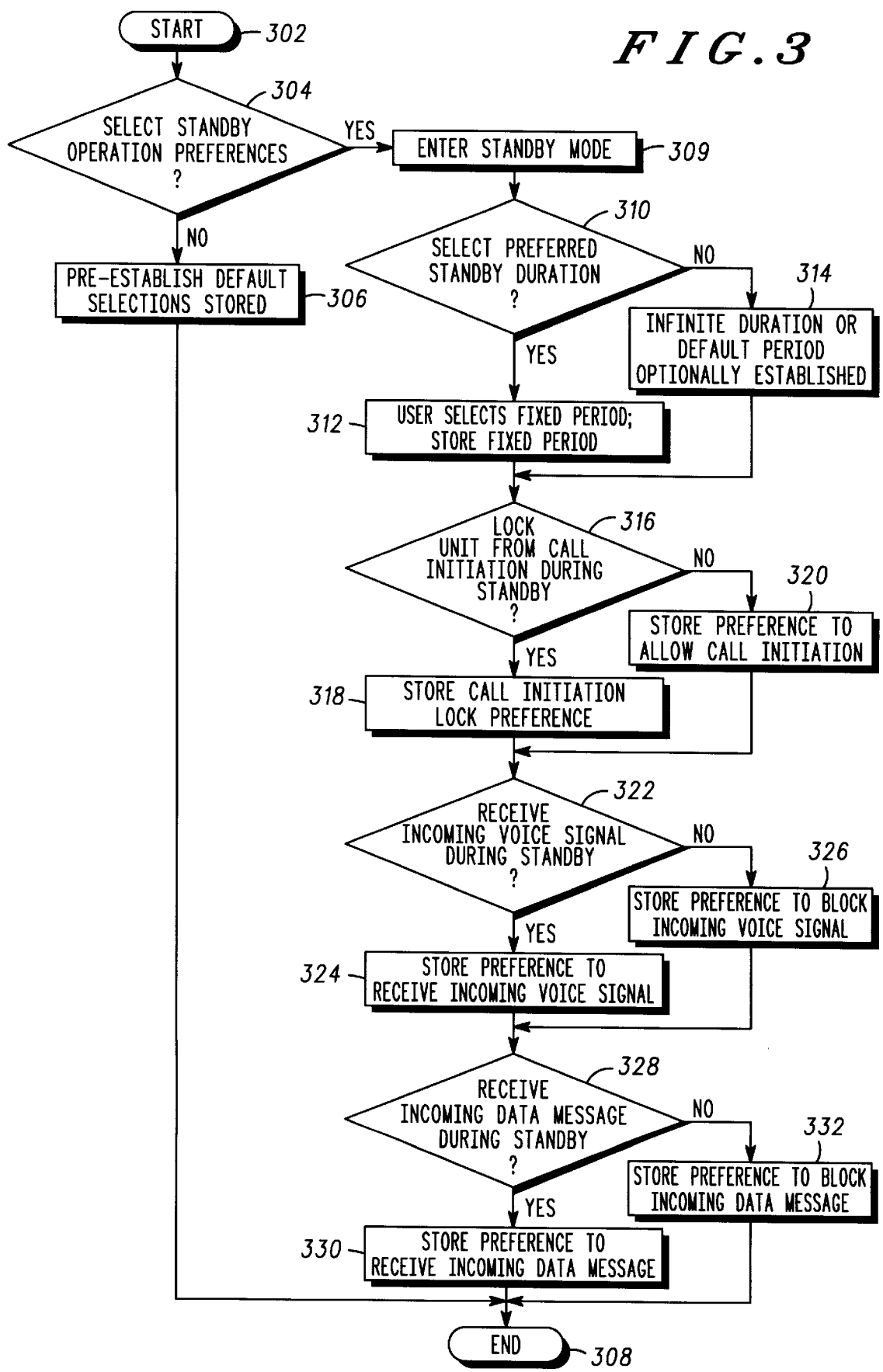
FIG. 3 is a flow chart showing user selectable functions of a standby mode according to the present invention.

Turning now to FIG. 3, a flow chart shows the selection of available functions which are active in the communication device during the standby mode. At a step 304, the user has the option of selecting standby operation preferences. If the user does not desire to enter standby operation preferences, pre-established default selections for standby operation will be stored at a step 306. If the user wishes to select standby operation preferences, the user enters a standby set-up mode at step 309. The user then has an option of selecting the preferred standby duration at a step 310. The user may then select a fixed period which is stored at a step 312. If the user does not wish to select a standby duration, the communication device may operate in the standby mode indefinitely, or a default duration may optionally be established at a step 314. The default duration, which may be based upon the estimated life of a car battery, for example, may be stored by the manufacturer at the time of manufacture.

A user may also opt to lock a communication device from call initiation during standby at a step 316. If the user wishes to prevent any call from being made from the device during standby, a call initiation lock preference will be stored at a step 318. However, if a user wishes calls to be initiated during the standby mode to verbally communicate or transmit data, the preference to allow a call to be initiated will be stored at a step 320. The user also has an option to select whether incoming voice signals can be received during standby at a step 322. If the communication device has an answering machine, the user can select a preference to answer incoming voice signals at a step 324. However, if the user does not wish to receive incoming voice signals, the user can store a preference to block incoming voice signals at a step 326. Finally, a user also has the option of selecting whether the communication device will receive incoming data during standby at a step 328. If the user desires to receive incoming data, the user will store a preference to receive incoming data at a step 330. If the user does not desire to receive incoming data, the user will store a preference to block incoming data at a step 332. After selecting all the preferences, the function is ended at a step 308. While specific standby features are shown in FIG. 3, it is understood that these features are given by way of example only. Fewer standby features or additional standby features could be added by those skilled in the art without departing from the true spirit and scope of the present invention. For example, any paging or messaging service, digital or analog, which may be available now or in the future could be selected by the user.

Figure 4:
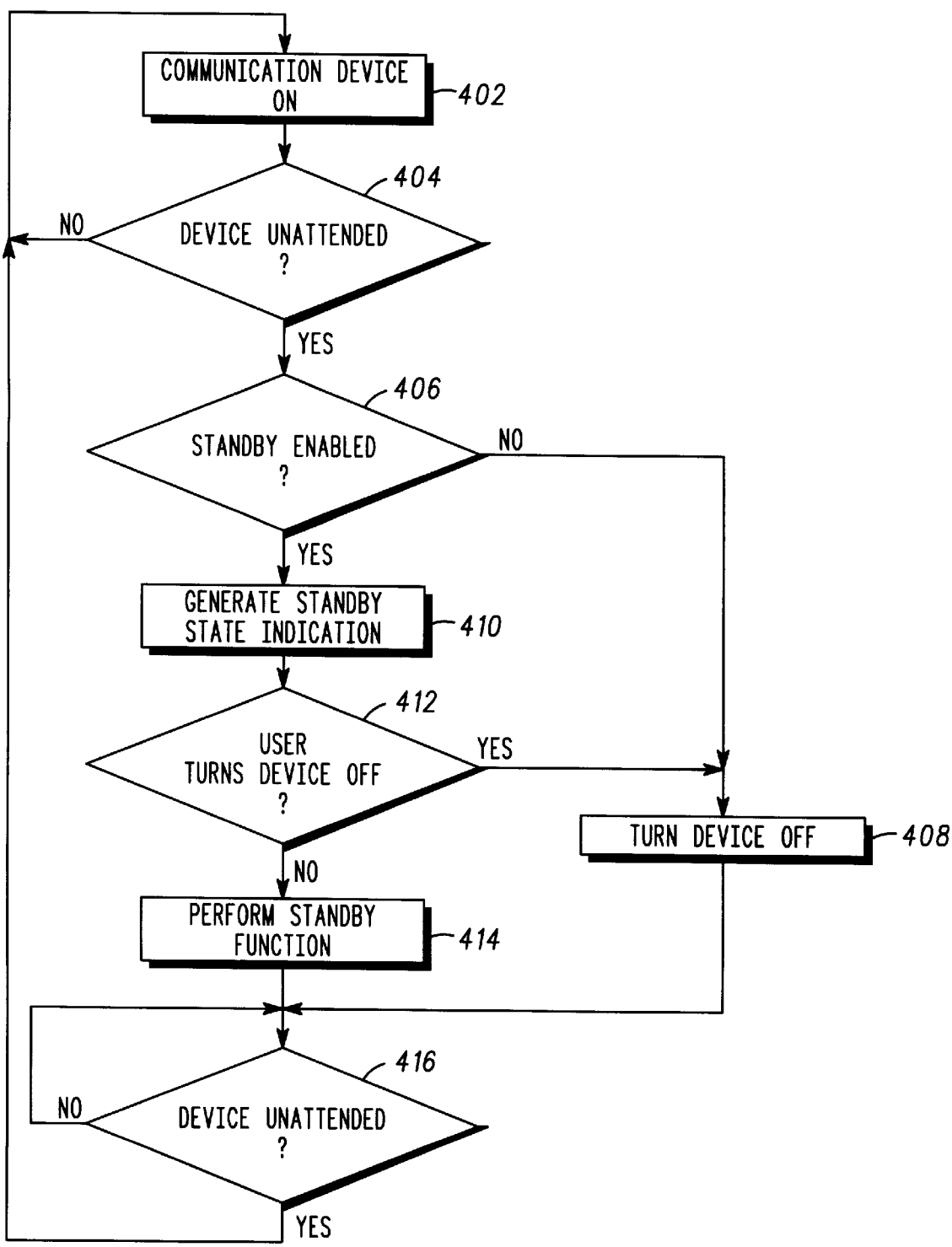
FIG. 4 is a flow chart showing the operation of a wireless communication device according to the present invention.

Turning now to FIG. 4, a flow chart shows the operation of a communication device incorporating the present invention. In particular, the communication device is turned on at a step 402. The communication device detects whether the device is unattended at a step 404. For example, for a cellular telephone installed in an vehicle, an ignition sense signal could be monitored to determine whether the telephone is unattended. If the communication device is unattended, the communication device determines whether the receive standby mode is enabled at a step 406. If the receive standby is not enabled, the communication device is turned off at step 408. If the receive standby is enabled, the communication device will emit a standby state indication at a step 410. For example, an audible, visual or some other indication will remind the user that the communication device will operate in the standby mode. The communication device will then determine whether the user sends an off command, for example by depressing the power button, at step 412. If the user sends an off command, the unit will be turned off at a step 408. However, if the user does not send an off command, the communication device will perform standby functions at a step 414.

Turning now to FIG. 5, the operation of the communication device in the standby function at step 414 of FIG. 4 according to the preferences selected in FIG. 3 is shown. At a step 504, the communication device establishes a time-out period. The predetermined time-out period can be selected by the user or may be a default period established by the manufacturer. The communication device determines whether an incoming call is detected at a step 506. If an incoming voice signal is detected, the communication device determines at a step 508 whether the incoming call option has been selected during the initial setup (FIG. 3). If the option has been selected, the device receives the incoming voice signal at a step 510. After processing any incoming voice signal if possible, the communication device determines whether any incoming data is detected at a step 512. If incoming data is detected, the communication device determines at a step 514 whether the option has been selected to receive incoming data. If the user has opted to receive incoming data, the communication device will receive the incoming data at a step 516. After processing the incoming data, the communication device will determine whether any outgoing call is attempted at a step 518. If any outgoing call is attempted, the user determines whether the unit is locked from call initiation at a step 520. If the unit is not locked, the communication device will send the call at a step 522. Finally, after determining whether to send a call, the communication device will determine whether the timer has expired at a step 524. If the timer has not expired, the communication device will again determine whether an incoming call is detected at step 506. If the timer has expired, the communication device will powered down at a step 526.

In summary, some recent products have enhanced the functionality of wireless communication devices, such as cellular telephones, when a user is not present. For example, cellular digital messaging services, paging services and the transmission of facsimiles and computer files by way of cellular networks can be accomplished when a user is away from the cellular telephone. The present invention eliminates the need for a user to enable a standby mode when the user intends to leave the wireless communication device unattended. In particular, the present invention provides for a wireless communication device having a convenient method for storing/enabling preferred functions which are activated when the communication device is in the standby mode. If the standby mode feature is enabled, the preselected functions to be performed in the standby mode are automatically performed when the communication device is unattended, such as when a predetermined ignition sense signal is detected. While specific functions in the standby mode are described above, fewer or additional functions could be employed by one skilled in the art within the true spirit and scope of the present invention. The invention should be limited only by the following claims.

I claim:

1. A method for enabling standby operation in a communication device to receive predetermined messages when said communication device is unattended, said method comprising the steps of:

detecting the selection of a standby set-up mode;

detecting the selection of at least one function of a plurality of available functions to be performed during standby operation wherein the plurality of available functions includes:

select incoming voice signals reception but not incoming data reception; and select incoming data reception but not incoming voice signals reception;

storing said at least one function to be performed during standby operation; and detecting a predetermined signal indicating that the device has entered a standby mode.

2. The method for enabling standby operation according to claim 1 wherein said step of detecting the selection of at least one function includes detecting the selection of a default function to be performed during standby operation.

3. The method for enabling standby operation according to claim 2 wherein said step of detecting the selection of a default function to be performed comprises detecting the selection of a default duration of operation during the standby operation.

4. The method for enabling standby operation according to claim 1 wherein said step of detecting the selection of at least one function of a plurality of functions comprises selecting at least one function from the plurality of available functions wherein the plurality of available functions further includes:

establish standby duration;

select call initiation availability;

select incoming voice signal availability and incoming data availability;

select incoming digital messages availability; and select incoming paging availability.

\* \* \* \* \*